June 14, 1927.

N. GHERASSIMOFF

WHEEL TIRE

Filed March 5, 1926

1,632,731

Inventor
Nicolas Gherassimoff
By
Attorney

Patented June 14, 1927.

1,632,731

UNITED STATES PATENT OFFICE.

NICOLAS GHERASSIMOFF, OF LE VÉSINET, FRANCE.

WHEEL TIRE.

Application filed March 5, 1926, Serial No. 92,524, and in France February 12, 1926.

The drawbacks to which pneumatic tires are subject have given rise to attempts to replace them by devices not having an air tube or inner tube, since the more frequent and serious accidents which occur are due to this inner tube. Attempts, therefore, have been made to construct tires and wheels, known as elastic, wherein air-tubes or pneumatic elements were not used, the elasticity of these tires or wheels being generally obtained by means of springs which were liable to wear out rapidly, and which were subject to the drawback that they came into operation successively and in a different manner relative to each other.

The present invention relates to a wheel-tire which comprises the usual air-tube, but in which this air-tube is efficiently protected against damage by means of a supple metal protective cover which is sufficiently flexible to afford the resilient qualities of the pneumatic tire.

The invention consists in forming as a cover or casing for the air tube a metallic band consisting of a series of strips arranged transversely to the axis of the air tube and overlapping each other, these strips being hooked by their extremities under the flanges of the rim to which the casing is applied.

The invention also contemplates the formation of the tread-band of this supple metallic outer cover by means of bosses formed preferably by a pressing operation upon the metal strips, these bosses being filled internally with a light and rigid packing material which is flush with the inner face of the said strips.

The invention further contemplates making the bosses on alternate strips of different heights, so as to enable two bosses of the maximum height to come into contact simultaneously with the ground, thus causing the simultaneous flexing not only of the corresponding strips but also of the immediately adjacent strips.

The invention furthermore contemplates the making of the beads for attaching the said outer cover to the rim in the form of hooks formed at the lateral extremities of the strips and provided with a rubber band covered with fabric which is fixed thereto by screws and by means of a metal counterplate.

The invention finally contemplates the interposition of a sheath of impermeable material between the inner tube and the supple metallic outer cover. This sheath may be of textile material treated with rubber and it protects the inner tube from dampness, mud, and dust.

An embodiment of the invention is shown, by way of example in the accompanying drawing.

Figure 1:
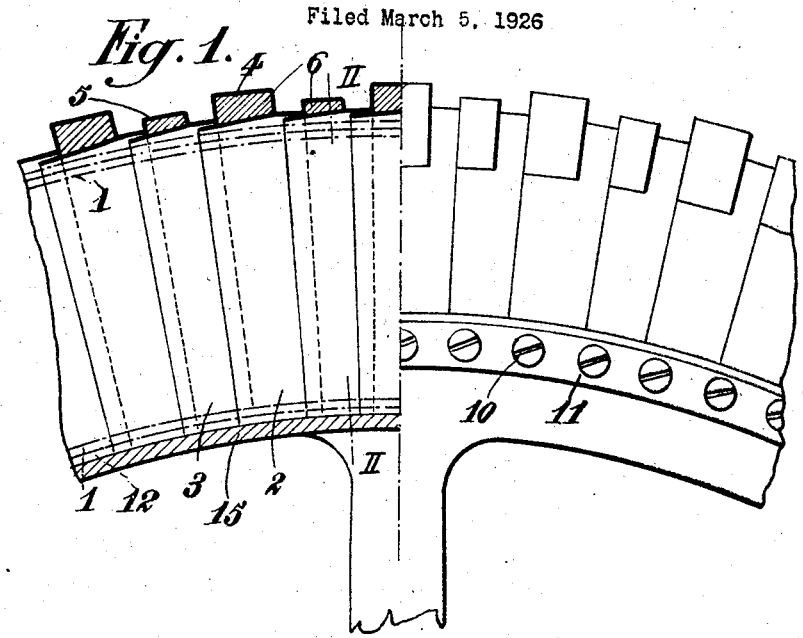

In the drawing Fig. 1 is a side view, half in section and half in elevation, of a portion of a pneumatic tire constructed according to the present invention in place upon the rim of a wheel.

Figure 2:
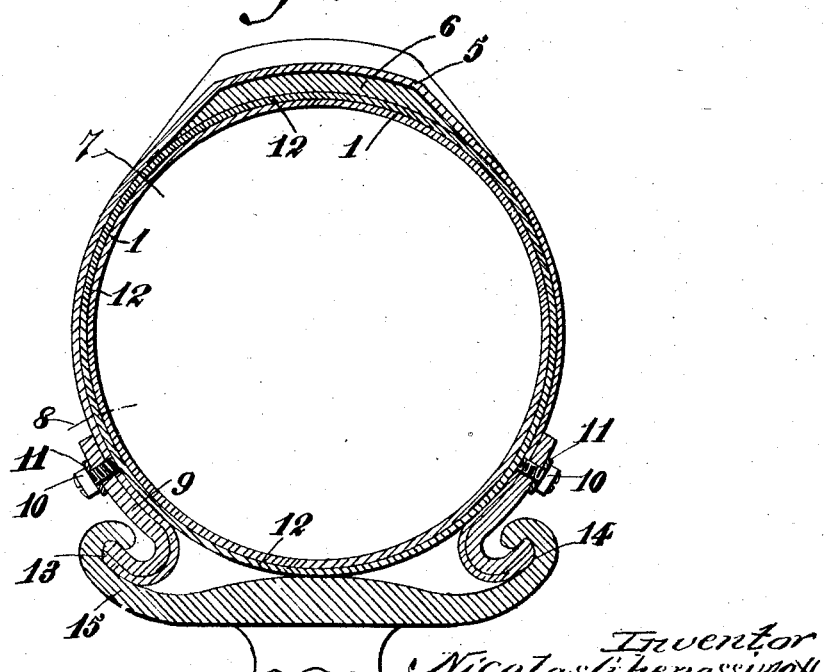

Fig. 2 is a cross-section along line II—II of Fig. 1.

This tire comprises the usual air-tube 1, and a protecting outer cover formed of a series of metallic strips 2 and 3 arranged one after the other and having their edges slightly overlapping. The metal strips 2 are preferably slightly wider than the strips 3, but the overlapping of the strips is sufficient to ensure that they always cover each other, whatever may be the flexing movement of the tire, so as to prevent any nipping or pinching action upon the air tube 1.

The tread-band of this tire is constituted by projections formed upon the metallic strips 2 and 3, these projections being alternately of different heights, for example the projections 4 carried by the strips 2 have a greater height than the projections 5 carried by the strips 3. It is obvious that these projections could be formed upon the metallic strips in any suitable manner, but it is preferable, both with a view to economy in manufacture and with a view to obtaining lightness, to give them the form of bosses obtained by stamping the said strips, the recess thus formed in the interior of each of the bosses being filled with a packing 6 consisting of a light but strong material, such as wood. It is not necessary that the metallic strips 2 and 3 be of the same thickness throughout their entire cross-section. For instance, it is preferable that they should have the least possible thickness, for example 1 mm., in the lateral portion of the tire which is subject to the greatest flexion, comprised between the points 7 and 8 in Fig. 2. Their extremities, which are destined to form the attaching beads, are thicker and are each fitted with a band of rubber 9 enclosed in fabric and which follows the contour of the said extremities, which are curved to form hooks, as shown in Fig. 2.

Each of the elements of the metal outer cover has each of its extremities secured to the rubber band by means of a single screw 10, which is screwed both into a metal counterplate 11 and into the strip 2 or 3 itself. This method of fitting the metal strips upon the assembling band 9 and upon the counter-plate 11 by means of a single screw, gives more suppleness to the outer cover as a whole, because it enables each of the elements 2 and 3 to oscillate freely and independently of the adjacent elements. The bosses 4 and 5 formed on the elements 2 and 3, in addition to constituting the tread-band of the tire, also serve as abutments for the edge of the adjacent elements so as to limit the overlapping of the strips.

In order to protect the air-tube against foreign matter, such as mud, gravel and the like, which might penetrate between the elements of the metal outer cover, it is preferable to insert an impermeable protecting sheath 12 between this outer cover and the air-tube which sheath might for example be made of a rubberized fabric.

The outer cover is mounted upon the air-tube in the same way as an ordinary outer cover, the beads 13 and 14 thereof engaging in the flanges of the rim 15 in such a manner as to maintain the whole firmly in position. When the wheel is running, each of the elements yields successively on coming into contact with the ground and acts upon the adjacent elements so as to cause them to yield in turn, the elasticity of these elements enabling them to resume their original shape under the pressure in the air-tube, as soon as they are no longer in contact with the ground.

By forming the bosses of the tread of different heights, the advantage is obtained that two elements of the outer cover are caused to act simultaneously with a substantially equal flexion, while the element situated between them only comes effectively into action when the former two have flexed to a given extent. For example, when two adjacent bosses 4 are simultaneously in contact with the ground, the corresponding metallic strips 2 yield simultaneously and take with them in their flexion the strips 3 which they overlap, until this flexion is sufficient to bring the boss 5 placed between them, into contact with the ground, and, as it yields, causes the strip which carries it, to bend, these successive flexions taking place in a very short space of time.

It is obvious that various modifications in detail could be made in the arrangements which have just been described, without departing from the spirit of the invention.

I claim:

A wheel tire comprising a plurality of metal outer strips adapted to enclose an air tube, each extremity of each strip being bent for engagement into a rim-flange, a pair of bands each having one of its edges curved and adapted to be inserted between one series of strip extremities and a rim-flange, and a single screw connection between each extremity of each strip and the band associated therewith.

NICOLAS GHERASSIMOFF.